(12) United States Patent
Haryanto et al.

(10) Patent No.: US 8,943,843 B2
(45) Date of Patent: Feb. 3, 2015

(54) ENERGY-SAVING AND ENVIRONMENTALLY-FRIENDLY MULTIPURPOSE AIR CONDITIONING AS A GENERATOR OF DEW DRINKING WATER, HOT WATER AND DRYER

(75) Inventors: Budhi Haryanto, Jakarta Pusat (ID); Arda Rahardja Lukitobudi, Cimahi (ID)

(73) Assignee: Budhi Haryanto, Gambir, Jakarta Pusat (ID)

( * ) Notice: Subject to any disclaimer, the term of this patent is extended or adjusted under 35 U.S.C. 154(b) by 457 days.

(21) Appl. No.: 13/392,725

(22) PCT Filed: Sep. 21, 2010

(86) PCT No.: PCT/ID2010/000009
§ 371 (c)(1),
(2), (4) Date: Feb. 27, 2012

(87) PCT Pub. No.: WO2011/067747
PCT Pub. Date: Jun. 9, 2011

(65) Prior Publication Data
US 2012/0159972 A1  Jun. 28, 2012

(30) Foreign Application Priority Data
Dec. 1, 2009  (ID) .............................. P00200900632

(51) Int. Cl.
E03B 3/28 (2006.01)
F24F 13/14 (2006.01)
D06F 58/20 (2006.01)
(Continued)

(52) U.S. Cl.
CPC .......... *F24F 13/1406* (2013.01); *D06F 58/206* (2013.01); *E03B 3/28* (2013.01); *F24F 5/0096* (2013.01); *F24F 13/222* (2013.01)
USPC ............................................................ 62/93

(58) Field of Classification Search
CPC .. F24F 13/1406; F24F 5/0096; D06F 58/206; E03B 3/28; G05D 22/00
USPC ........... 62/78, 91, 93, 150, 176.1, 176.6, 180, 62/259.4, 264; 165/16, 22; 236/44; 700/276; 454/229; 34/77, 607
See application file for complete search history.

(56) References Cited

U.S. PATENT DOCUMENTS 4,941,326 A * 7/1990 Sumi et al. ...................... 62/180
5,269,153 A   12/1993 Cawley
(Continued)

FOREIGN PATENT DOCUMENTS

WO   2007069836 A1   6/2007

*Primary Examiner* — Mohammad M Ali
*Assistant Examiner* — Emmanuel Duke
(74) *Attorney, Agent, or Firm* — Fay Sharpe LLP

(57) ABSTRACT

A method and machine for producing fresh and cool air, dew drinking water, hot air for the dryer, hot water for bathing or other purposes using an energy-saving and environmentally-friendly multipurpose air conditioning as a generator of dew drinking water, hot water and dryer. Mixture of fresh outdoor air and returned air from the rooms passed to the evaporator coils to condense the moisture from the air to produce pure and fresh dew drinking water and cool fresh air, where the air is then flown back into the room. Municipal water or other water then dip the hot discharge line to subcool the refrigerant before entering the condenser thus saving energy and at the same time produce hot water that can be used for bathing or other purposes. Hot air coming from air-cooled condensers can be used as a dryer.

9 Claims, 1 Drawing Sheet

(51) Int. Cl.
*F24F 5/00* (2006.01)
*F24F 13/22* (2006.01)

(56) References Cited

U.S. PATENT DOCUMENTS

| | | | | |
|---|---|---|---|---|
| 5,921,088 | A * | 7/1999 | Imaizumi et al. | 62/3.4 |
| 6,071,189 | A * | 6/2000 | Blalock | 454/236 |
| 6,427,461 | B1 * | 8/2002 | Whinery et al. | 62/176.6 |
| 7,469,486 | B2 * | 12/2008 | Tamura et al. | 34/77 |
| 2004/0040322 | A1 | 3/2004 | Engel et al. | |
| 2007/0169366 | A1 * | 7/2007 | Tadano | 34/77 |
| 2008/0104974 | A1 * | 5/2008 | Dieckmann et al. | 62/93 |
| 2008/0173030 | A1 * | 7/2008 | Levan et al. | 62/93 |
| 2008/0276630 | A1 * | 11/2008 | Lukitobudi | 62/93 |
| 2008/0307802 | A1 * | 12/2008 | Forkosh | 62/78 |
| 2009/0211274 | A1 * | 8/2009 | Meng | 62/93 |
| 2009/0211275 | A1 * | 8/2009 | Castanon Seoane | 62/93 |

* cited by examiner

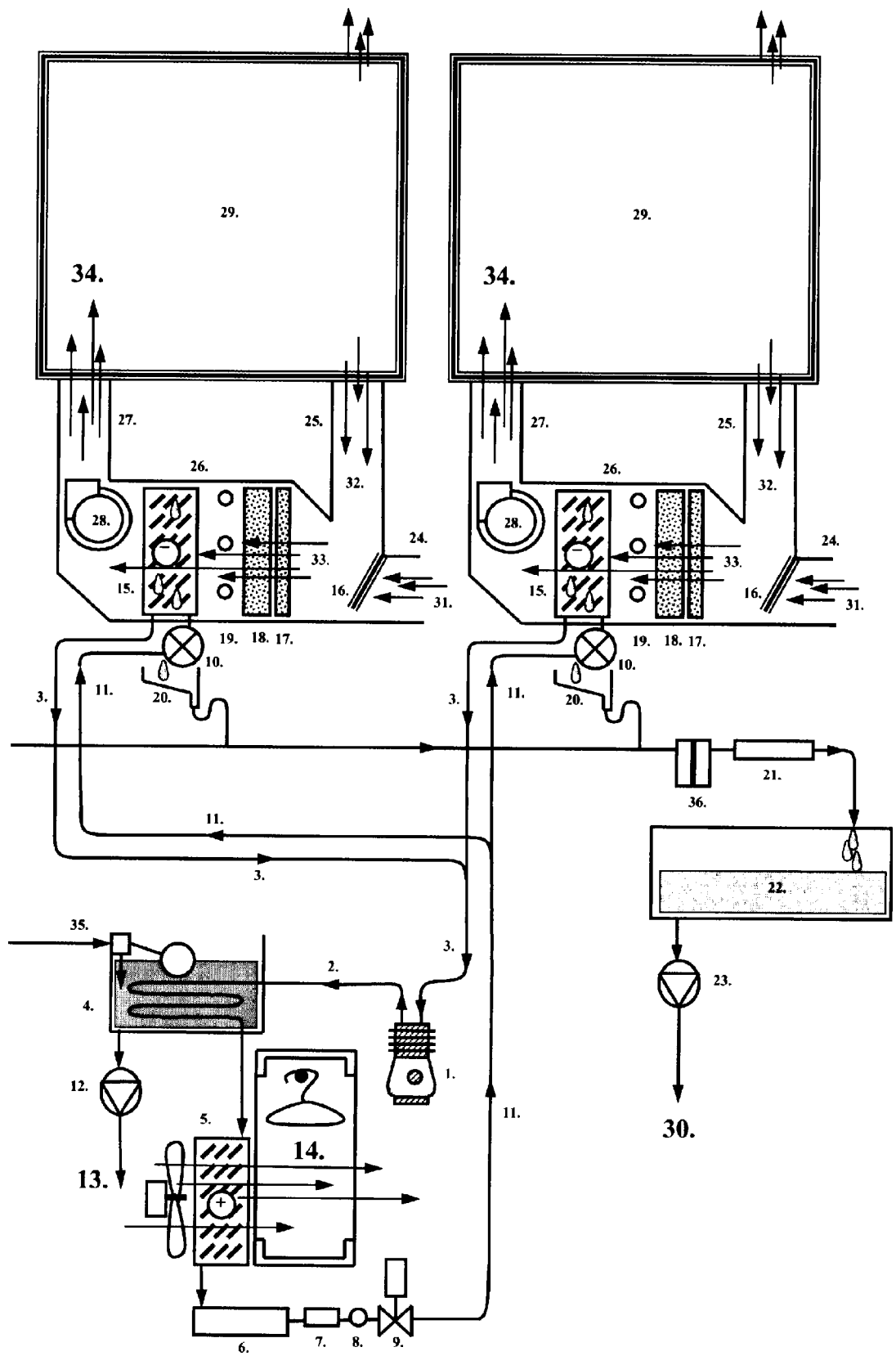

ENERGY-SAVING AND ENVIRONMENTALLY-FRIENDLY MULTIPURPOSE AIR CONDITIONING AS A GENERATOR OF DEW DRINKING WATER, HOT WATER AND DRYER

TECHNICAL FIELD

This invention is related to energy-saving and environmentally-friendly multipurpose air conditioning as a generator of dew drinking water, hot water and dryer. This unit produces fresh cool air, dew drinking water, hot water for shower or other needs and hot air for clothes dryer or other purposes. The mixture of fresh air and returned air pass through evaporator coil to condensate the air and produce pure and fresh dew as well as fresh cool air, which is subsequently ventilated to rooms. City water distribution system/well water/other water are used to subcool the refrigerant before getting into condenser by dipping the discharge line into the water and saving energy as well as concurrently producing hot water. Hot air produced from air cooled condenser can be utilized as dryer.

BACKGROUND ART

Many nations worldwide have been suffering from water crisis. They are also lack of drinking water due to pollution, contamination and waste dumping. This may result in health issue in drinking water.

There have been various attempts to overcome by condensing water aqueous vapor and purifying it in a system used as drinking water.

Hot water is also required for household purposes such as bathing, laundry, dish washing or other needs and hot air is essential for drying clothes or other purposes. It would be interesting if it is a cost-free auxiliary product and able to reduce energy consumption.

In the U.S. Pat. No. 7,347,009 with regard to clothes dryer using air dryer, the clothes dryer includes a cabinet, a drying rotating container installed in the cabinet, a driving unit for supplying a rotational force to the drying container, a first air passage connected to a side of the drying container and including a first heat exchanger, a second air passage connected to another side of the drying container and the outer side of the cabinet, and a third air passage including a second heat exchanger for dehumidifying external air of the drying container. The clothes dryer of the present invention performs drying process and dehumidifying process, the clothes dryer can prevent room humidity from increasing.

In the U.S. Pat. No. 6,481,232, it is revealed that a combination of fresh water production from air humidity at the same time with air cooling in hot and humid climate through water vapor condensation from air conditioning unit and dehumidifier. The air conditioning unit is set out in such a way that when external air passes through the unit, it will increase the condensation and production of fresh water and produces cooled air at the same time.

In the U.S. Pat. No. 6,684,648, it is revealed that fresh water extraction from the external air in hot and humid climates, so that fresh drinking water available in remote areas where water resources are scarce. The portable and compact unit is designed to produce drinking water including the use of UV, ozone, chlorine, active carbon and filters as well as the fluorine and oxygen addition to make it fresher and minerals for taste and health. To be more energy efficient, water is flowed by gravity or with the aid of a small pump. Warm, hot, cold or cold carbonated drinking water can be available or even fresh water for other uses.

In the U.S. Pat. No. 6,755,037, it is revealed that tools and methods for extracting the bottled water filtered from the air through the use of a refrigeration system, either as indoor/outdoor unit, window or wall unit, portable indoor/outdoor unit, or may be integrated with existing ventilation or refrigerator units. The unit can serve as air dryer, air purifier, heat pumps for air cooling or heating. Produced water can be cooled by the secondary evaporator and heated by the secondary condenser or electric heater connected to the secondary compressor to separate it from the air condensing system.

In the U.S. Pat. No. 7,055,262, it is revealed that an additional drying component such as clothes dryer. The air is cooled by passing it through the evaporator at a temperature of below the dew point to condense and is subsequently channeled through the condenser to be heated to dry. The unit consists of a compressor, condenser, thermostat expansion valve and evaporator.

In the U.S. Pat. No. 7,191,546, it is revealed that a clothes dryer that has a timer that can adjust the time period to operate the dryer and electric heater with thermostat that can initially heat and maintain a minimum temperature of 90 degrees Fahrenheit. The air dryer circulates air through air channel and dryer cabinet by a fan. This unit has an evaporator where the hot and humid air is passed through to cool air and condense water vapor so that water is collected in a container. Then the dry cold air is passed through a condenser to be heated and then channeled into the cabinet through the air channel so it will dry clothes or else put in the cabinet.

In the U.S. Pat. No. 7,458,171, it is revealed that a low-temperature air dryer clothes dryer with closed-cycle air system that do not require external air source, or remove the air out so it does not depend on the location. Low-power compressor system that will condense the air which has passed through the wet clothes. A heating coil is also provided.

In the Patent No. WO 2004/027165 A1, it is revealed that an air dryer instrument produces drinking water by condensing water vapor from air humidity. But the instrument is not energy saving and produced water is too cold and it needs a fan to produce fresh water.

In the U.S. Pat. No. 5,553,459, it is revealed that a instrument that produces water from room air. A unit consisting of a compressor, condenser, expansion valve and evaporator will cool the water in a tank in which the cold water will be channeled to a cooling coil where water vapor from the room air will be condensed. The instrument is not power sufficient and it does not only circulate cold water cooled by the evaporator to produce drinking water.

WO 2007/009488A1 reveals an air cooling method in which air is at first cooled by the initial coolant and then cooled by the primary coolant to enhance the condensation of water. This method saves energy and increases the condensation of water where the cold air from the primary coolant is channeled to the initial coolant as a cooling medium. This method is talking about energy saving through cooling stage and about coolant serving to produce drinking water.

P00200700212 reveals a refrigeration and air condenser to produce energy saving and environmentally-friendly drinking water in which the machine consists of cooling unit and air treatment unit, and in the air processing unit are evaporator coils which can condense water vapor from the air. Inside the evaporator coil, water from the cooling unit is channeled.

From the above description of some invention, when viewed carefully, it can be concluded that no single invention that reveals the existence of a multipurpose cooling machine which also can produce the fresh cold air, dew drinking water, hot water used for shower or other purposes and hot air used for clothes dryer or other purposes. There is only a combination of two or a maximum of three benefits such as a cooling machine and clothes dryer, air dryer machine and hot water generator, etc. Thus, on this occasion a patent will be filed related to energy-saving and environmentally-friendly multipurpose air conditioning as a generator of dew drinking water, hot water and dryer.

DISCLOSURE OF INVENTION

The main objective of this invention is to provide fresh cool air from an air conditioning unit which can simultaneously produce dew drinking water by condensing water vapor from humid air, which can serve as a clothes dryer or other purposes by using hot air from the condenser as well as saving power by dipping the discharge line of the compressor with cooling water and at the same time will produce hot water.

The multipurpose air conditioning unit of this invention consists of
Air conditioning unit which has:
Evaporator coils;
Drip pan under each evaporator coils;
Dew drinking water tank, pipes, water filters, UV lamp tube, dew drinking water pump;
Discharge line cooler, hot water tank, pipes, hot water pump, municipal water/well water/other water;
Air cooled Condenser;
Dryer hanger steel bars, cabinet;
Expansion valves, solenoid valve, sight glass, filter dryer, liquid receiver;
Compressor;
Supply air ducts, mixing air ducts, returned air ducts, fresh air ducts, pre air filters, medium air filters, UV lamps, blower fans, air flow dampers;
Thermostat, air flow controller, pressure controller, oil pressure controller, air differential pressure controller;
Where air handling units connected to the outdoor air by fresh air ducts which are then mixed with returned air from rooms through returned air ducts, where the composition of the mixture can be adjusted by adjusting the air flow dampers, then the mixture of air flowing through the mixing air ducts in which in the intake of mixing air ducts upstream the evaporator coils installed air pre filters, medium air filters and UV lights to sterilize and healthful air as a dew drinking water and cool fresh air supply;
The unit is installed evaporator coils to condense the water vapor, and under each coil is installed drip pan to accommodate water droplets resulting from condensation water evaporator, where water is channeled through a water pipe where the pipe is installed water filters and UV lamp tube to sterilize the water so that water is drinkable which is then connected to a dew water storage tank and dew water pump; While the fresh cool air after passing through the evaporator coils and then supplied into the room through the supply air ducts;
A compressor will compress the refrigerant from the evaporator coils and then throw it into the discharge line cooler, and then to the air-cooled condenser, the liquid receiver, filter dryer, sight glass, solenoid valves, expansion valves, evaporator coils and then returned to the compressor;
Discharge line cooler using a municipal water/well water/ other water to subcool the refrigerant and save the energy where the hot water being generated can be used for bathing or other purposes;
Air-cooled condensers where the hot air coming out of the condenser flowed into the cabinet that has a dryer hanger steel bars that can be used as a clothes dryer or other purposes.

Thermostat is needed to control the room temperature. The air flow controls is needed to control the air flow. The refrigerant high and low pressure control is needed to maintain the compressor in safe condition. The oil pressure control is needed to make sure that the oil is always available in the compressor. The air differential pressure control is needed to give sign if the air pre filter and medium filter is dirty and need to be replaced.

The water production machine of this invention where all equipments of the unit include all pipe, parts and water pump which is passed by the condensate water of this water production machine should made of foodgrade metal, preferable made of stainless steel.

The water production machine of this invention using an environmentally friendly refrigerant is to gain environmentally friendly substance application.

Multipurpose air conditioning machines of this invention include:
Discharge line cooler after the compressor is dipped into the municipal water/well water/other water to cool the hot and high pressure refrigerant from the compressor and consequently will save power and at the same time will produce hot water that can be used for bathing or other purposes;
refrigerant will then flow into the air-cooled condenser to condense refrigerant vapor, where hot air coming from the condenser can be used as a clothes dryer or other purposes;
high pressure liquid refrigerant then will flow into the liquid receiver, filter dryer, sight glass, a solenoid valve and then to the expansion valves to expands the liquid refrigerant to lower pressure and temperature and then going into the evaporator coils in order to take the heat of evaporation and water vapor will condense in the air and dew will be generated and simultaneously cool and fresh air;
Water is then flowed through a water pipe where the pipe is installed water filters and a UV light tube to filter and disinfect the water so it is drinkable, the dew water then flowed into the dew drinking water storage tank and dew water pump;
The unit take fresh air through the fresh air ducts, mixing it with returned air from the room through the returned air ducts with the aid of air flow dampers and passing it through the mixing air ducts to the evaporator coils. On the input of mixing air ducts before the evaporator coils is installed air pre filters, medium air filters and UV lights to sterilize air and sanitize the air which will serve as a dew drinking water supply and cool fresh air;
then the fresh cold air is flown back into the rooms through supply air ducts;
The refrigerant after passing through the evaporator coils will then be sucked into the compressor and then compressed at high pressure and high temperature and then flown back to the discharge line cooler.

A method to produce cold fresh air using energy-saving and environmentally-friendly multipurpose air conditioning as a generator of dew drinking water, hot water for bathing or other purposes and hot air for clothes or other comprising of these following steps:

filtering and sterilizing mixing air through the pre air filters, medium air filters and UV lights where the mixing air is coming from a mixture of fresh outdoor air of the fresh air ducts and returned air from the rooms of the returned air ducts with the aid of air flow dampers, then passing into the evaporator coils to condense moisture from the air and collect dew droplets generated into a drip pan. Water will be channeled through a water pipe in which on the pipes installed water filters and UV lights tube so that the dew water is drinkable, and then connected to a dew water storage tank and dew water pump; at the same time it will also produce fresh cold air which is supplied to the rooms;

passing the discharge line from the compressor to a discharge line cooler by dipping it into the municipal water/well water/other water in the cooling tank to subcool the refrigerant vapor and at the same time will produce hot water and save the energy;

hot air coming from air-cooled condensers can be used as a clothes dryer.

BRIEF DESCRIPTION OF THE DRAWING

To explain this invention, will be illustrated in the accompanying drawing:

FIG. 1 shows a schematic drawing not to scale of energy-saving and environmentally-friendly multipurpose air conditioning as a generator of dew drinking water, hot water and dryer.

DETAILED DESCRIPTION OF THE INVENTION

The following description will explain in detail the energy-saving and environmentally-friendly multipurpose air conditioning as a generator of dew drinking water, hot water and dryer.

In accordance with FIG. 1, compressor (1) will sucked refrigerant vapour coming from the evaporators (15) through the suction line (3) and compress it at high pressure and temperature and then circulate to the air cooled condenser (5) through the discharge line (2). In the discharge line (2) there is a discharge line cooler (4) where the municipal water (35) cools the discharge line to subcool the refrigerant vapour and thus saving the energy and at the same time producing hot water (13) which can be used as shower or else. The air cooled condenser (5) is cooled by the outdoor air (31), and the hot air (14) after passing the condenser is flown to the cabinet which has dryer hangers which can be used as a clothes dryer or else. After passing the air cooled condenser (5), the refrigerant then passed to the liquid receiver (6), through the filter dryer (7), sight glass (8) and solenoid valve (9) in the liquid line (11) and then to the expansion valves (10). After the refrigerant being expanded in the expansion valve, then the refrigerant pressure and temperature will drop signifantly and enter to the evaporators (15) where it will cool the mixing air (33) of the mixing air ducts (26) which is a mixture of fresh outdoor air (31) of the fresh air ducts (24) and return air from the room (32) of the return air ducts (25) by controlling through a dampers (16), and at the same time condense its moisture. Before the mixing air (33) entering the evaporators (15), it is passed through the air pre filters (17) and the medium filters (18) to be eliminated from the dust, dirt, and other polutant. Then the mixing air (33) is passed to the ultraviolet lights (19) to kill the bacteria and pathogenic mold to sterilize the air. The drip of the condensation as dew drinking water (30) will be collected to the drip pans (20) and then will be passed to the water filters (36) and UV lights tube (21) which is again will kill the bacteria and pathogenic mold in the dew water and is ready to be pumped by the water pump (23) to the storage tank (22). In the mean time the cold fresh air (34) after being removed its moisture in the evaporator coils (15) is then circulated by the blowers (28) to the rooms (29) through supply air ducts (27) so that the cold supply air (34) will enter the rooms (29). After leaving the evaporators (15) then the refrigerant will enter the compressor again (1) to be compressed at high pressure and temperature.

It is important to control so that the fresh air is cooled at the dew point so that the moisture will condense at this point. It is necessary to control the air flow. It is also necessary to control the refrigerant pressure to a minimum and maximum allowable pressure to maintain the compressor (1) in a safe condition. Oil pressure control is also necessary to make sure that the oil is always present in the compressor (1). If the air pre filters (17) and medium filters (18) are dirty and need to be replaced, so it is necessary to have a control to make a sign that those filters should have to be changed.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. A multipurpose air conditioning unit comprising: evaporator coils; one or more drip pans disposed under the evaporator coils to accumulate water droplets resulting from water condensation by the evaporator coils; a water pipe connected to the one or more drip pans to channel water from the one or more drip pans to a water storage tank; a drinking water tank; water filter and UV lamp tubes disposed in the water pipe to sterilize the water so that the water is drinkable; a drinking water pump connected to the drinking water tank; a discharge line cooler, a hot water tank, pipes, a hot water pump, a municipal water/well water/other water source; an air-cooled condenser; a dryer cabinet with hanger bars; expansion valves, a solenoid valve, a sight glass, a filter dryer, a liquid receiver; an air handling unit including supply air ducts, mixing air ducts, return air ducts, fresh air ducts, air filters, UV lamps, blower fans, air flow dampers; a thermostat, an air flow controller, a pressure controller, an oil pressure controller, an air differential pressure controller; wherein the air handling units are connected to outdoor air by the fresh air ducts which outdoor air is then mixed in the mixing air ducts with returned air from rooms returned through the return air ducts to create an air mixture, wherein relative amounts of outdoor and returned air in the air mixture are adjusted by adjusting the air flow dampers, wherein the evaporator coils, the air filters, and the UV lights are disposed in the mixing air ducts to sterilize and filter the air mixture and cool the air mixture, wherein the cool air mixture after passing through the evaporator coils is then supplied into the room through the supply air ducts; a compressor configured to compress a refrigerant from the evaporator coils and pass the compressed refrigerant through the discharge line cooler to the air-cooled condenser, the liquid receiver, the filter dryer, the sight glass, the solenoid valve, the expansion valves, the evaporator coils and then returned to the compressor; wherein the discharge line cooler uses a municipal water/well water/other water to subcool the refrigerant and to generate hot water which is conveyed to the hot water tank; wherein the air-cooled condenser generates hot air which flows into the dryer cabinet with the hanger bars that can be used as a clothes dryer; wherein the thermostat, the air flow controller, the high low pressure controller, the oil pressure controller, the air differential pressure controller control the multipurpose air conditioning unit.

2. The multipurpose air conditioning unit as claimed in claim 1 wherein the thermostat controls the room temperature.

3. The multipurpose air conditioning unit as claimed in claim 1 further including a refrigerant high and low pressure controller configured to maintain the compressor in a safe operating range.

4. The multipurpose air conditioning unit as claimed in claim 1 wherein the oil pressure controller is configured to maintain oil in the compressor.

5. The multipurpose air conditioning unit as claimed in claim 1 wherein the air differential pressure controller signals when the air filters are dirty and need to be replaced.

6. The multipurpose air conditioning unit as claimed in claim 1 wherein the drinking water tank, the water filter, the water pipe and the water pump are made of foodgrade metal, preferable made of stainless steel.

7. The multipurpose air conditioning unit as claimed in claim 1 wherein the refrigerant is an environmentally friendly refrigerant.

8. A multipurpose air conditioning machine comprising: a discharge line cooler configured to receive hot and high pressure refrigerant from compressor, the discharge line cooler being disposed in water to cool the refrigerant and at the same time produce hot water; an air-cooled condenser connected with the discharge line cooler and configured to condense the hot and high pressure refrigerant and heat air, hot air from the condenser being supplied to a dryer; an expansion valve configured to receive the refrigerant from the condenser and to expand the refrigerant to a lower pressure and temperature in evaporator coils, the evaporator coils being configured to condense water vapor from air flowing over the evaporator coils and generate condensate water and simultaneously cool the air; water filters and a UV light tube configured to filter and disinfect the condensate water which flows into a drinking water storage tank; filters and UV lights are installed to sanitize the air which flows over the evaporator coils and supply air ducts configured to supply the sanitized air to rooms; wherein the refrigerant after passing through the evaporator coils is sucked into the compressor and compressed at the high pressure and the hot temperature and flows to the discharge line cooler.

9. A method of producing cold fresh air, drinking water, hot water and hot air for dryer cabinet, the method comprising: mixing fresh and room air to generate mixed air and passing the mixed air through air filters and UV lights to generate filtered mixed air; passing the filtered mixed air over evaporator coils to condense moisture from the filtered mixed air and cool the filtered mixed air; collecting condensate condensed from the filtered mixed air into a drip pan, passing the condensate through filters and past a UV light so that the condensate is drinkable; collecting the drinkable condensate in a water storage tank, supplying the cool mixed air to rooms; passing compressed refrigerant from a compressor to a discharge line immersed in water in a cooling tank to subcool the refrigerant and heat the water in the cooling tank to generate hot water; passing air over a condenser configured to receive the refrigerant from the compressor to heat the air to generate hot air for drying.

* * * * *